United States Patent
Rizzo et al.

(10) Patent No.: US 6,653,587 B1
(45) Date of Patent: Nov. 25, 2003

(54) LASER ISOTOPE SEPARATION METHOD EMPLOYING ISOTOPICALLY SELECTIVE COLLISIONAL RELAXATION

(75) Inventors: Thomas Rizzo, Denens (CH); Oleg Boiarkine, Bremblens (CH)

(73) Assignee: Ecole Polytechnique de Lausanne (EPFL), Lausanne (CH)

( * ) Notice: Subject to any disclaimer, the term of this patent is extended or adjusted under 35 U.S.C. 154(b) by 0 days.

(21) Appl. No.: 10/048,423

(22) PCT Filed: May 12, 2000

(86) PCT No.: PCT/IB00/00639

§ 371 (c)(1), (2), (4) Date: May 7, 2002

(87) PCT Pub. No.: WO01/08788

PCT Pub. Date: Feb. 8, 2001

(30) Foreign Application Priority Data

Jul. 29, 1999 (EP) ............................................. 99810688

(51) Int. Cl.[7] ................................................. B01D 5/00
(52) U.S. Cl. ................................................... 204/157.2
(58) Field of Search ...................................... 204/157.2

(56) References Cited

U.S. PATENT DOCUMENTS

| | | |
|---|---|---|
| 4,287,037 A | 9/1981 | Marling .................. 204/158 R |
| 4,461,686 A | 7/1984 | Tuccio et al. .......... 204/157.1 R |
| 4,830,010 A | 5/1989 | Marshall ..................... 128/630 |

FOREIGN PATENT DOCUMENTS

| | | |
|---|---|---|
| EP | 0 417 327 | 3/1991 |
| FR | 2 530 966 | 2/1984 |

OTHER PUBLICATIONS

Evseev et al., "Laser Separation of Carbon Isotopes by Two–Frequency Dissociation of Freons", Sov. J. Quantum Electron., vol. 18, No. 3, Mar. 1988, pp. 385–392.*

Gilbert et al., "Mutiphoton Dissociation of UF6 at lambda = 16 um in supersonic jets", SPRIE, vol. 669 Laser Applications in Chemistry (month unavailable, 1986) , pp. 10–17.*

Ivaenko et al., Applied Physics B, 62, pp. 329–332, 1996. "Marcoscopic Ennchment of $^{12}C$ By a High–Power Mechanically Q–Switched $CO_2$ Laser".

(List continued on next page.)

Primary Examiner—Edna Wong
(74) Attorney, Agent, or Firm—Sturm & Fix LLP

(57) ABSTRACT

A method of separating isotopes from polyatomic molecules, in particular $^{13}C$ from trifluoromethane $HCF_3$, by applying to the polyatomic molecules in the gas phase two infrared laser beams of different frequencies. The first laser has a frequency appropriate to excite a low overtone transition of a light atom stretch vibration and produce vibrationally pre-excited molecules enriched in the desired isotopes, for instance $^{13}C$. The second laser has a frequency and energy fluence to selectively induce dissociation of the vibrationally pre-excited molecules by infrared multiphoton excitation. The product of the pressure of the molecules and the time-delay of the second laser pulse relative to the first allows collisional vibrational deactivation of a substantial amount of the vibrationally pre-excited molecules containing non-desired isotope(s), like $^{12}C$, before dissociation of the vibrationally excited molecules occurs, while there is no significant collisional vibrational deactivation of pre-excited molecules containing the desired isotope, like $^{13}C$. The dissociation products are hence highly enriched in the desired isotope.

11 Claims, 3 Drawing Sheets

OTHER PUBLICATIONS

V.Y. Baranov et al., (Proceedings of 4$^{th}$ All–Russian International Scientific Conference on "Physical Chemical Processes at Selection of Atoms and Molecules", 1999, pp. 12–16); and A. P. Dyad'kin, et al., (Proceedings of 4$^{th}$ All–Russian International Scientific Conference on "Physical Chemical Processes at Selection of Atoms and Molecules", 1999, pp. 17–20.

(P.H. Ma et al., Appl. Phys. B 49 503 (1989). Month unavailable. "Production of Highly Concentrated $^{13}$C by Continuous Two–Stage IRMPD. $CBr_2F_2$/HI, $CCl_2F_2$/HI, and $CBrClF_2$/HI mixtures".

Gauthier et al., (Appl. Phys. B. 28, 2, (1982)). Month unavailable. "Efficient Production of $^{13}C_2F_4$ in the Infrared Laser Photolysis of $CHClF_2$".

Evseev et al., (Appl. Phys. B 36, 93, 1985; Sov. J. Quantum Electron, 18, 385, 1988)). Month unavailable. "Highly Selective and Efficient Multiphoton Dissociation of Polyatomic Molecules in Multiply–Frequency IR–Laser Fields".

Evseev et al., (Appl. Phys. B 36, 93, 1985; Sov. J. Quantum Electron, 18, 385, (1988)). Month unavailable. "Laser Separation of Carbon Isotopes by Two–Frequency Dissocoation of Freons".

R. Rabinowitz et al.: "Two–color infrared isotopically selective decomposition of UF6"; Optics Letters., vol. 7, No. 5, May 1982, pp. 212–214, XP002129314; Optical Society of America, Washington, US ISSN: 0146–9592 the whole document.

Tiee, J.J. et al: "IR photosysis of SeF6: isotope separation and dissociation enhancement using NH3 and CO2 lasers." J. Chem. Phys. (Dec. 1, 1978) V. 69(11) P. 4756–4761. CODEN: JCPSA6 ISSN: 0021–9606, XP000869639 United States the whole document.

Pateopol, L. et al.: "Two colour multiple–photon dissociation of CF3T.", Laser Isotope Separation Editor: Paisner, J.A. Bellingham, WA: SPIE—The International Society OFR Optical Engineering. 1993. P. 210–218 of 297 P. Available from SPIE —The International Society For Optical Engineering, P.O. Box 10, Bellingham. WA 98, United States, XP00869634 the whole document. Month unavailable.

Ambartzumian, R.V. et al: "Isotope–selective dissociation of the OsO4 molecule by two pulse of infrared radiation at different frequencies." OPT. LETT. (Jul. 1977) V. 1(1) P. 22–24., XP000861588 United States the whole document.

Ma Peihua et al: "13c separation by IRMPD of Halogenated difluoromethanes." Innovative Laser Technologies in Nuclear Energy. Proceedings of the 6$^{th}$ International Symposium on Advanced Nuclear Energy Research. Japan Atomic Energy Research Inst., Tokyo (Japan) Mar. 1995. P. 997–1005 of 724 P. MF Available From INIS Under the RE, Japan, XP000869795 the whole document.

\* cited by examiner

LASER ISOTOPE SEPARATION METHOD EMPLOYING ISOTOPICALLY SELECTIVE COLLISIONAL RELAXATION

CROSS-REFERENCE TO RELATED APPLICATIONS

This application is the national phase application of International Application No. PCT/IB00/00639 filed May 12, 2000, which claims priority of EP No. 99810688.4 filed Jul. 29, 1999, entitled "Laser Isotope Separation Method Employing Isotopically Selective Collision Relaxation."

FIELD OF THE INVENTION

This invention relates to the separation of a desired isotope from polyatomic molecules containing different isotopes, by applying to the molecules in the gas phase at a predetermined pressure, near infrared radiation of a first pulsed laser and, after a predetermined time-lag which allows a sufficient number of collisions, infrared radiation of a second pulsed laser of different frequency to produce a chemical reaction resulting in a molecule, enriched in the desired isotope, which can be separated from the remainder of the material. The invention is exemplified in a particular by the separation of $^{13}C$ isotopes in polaytomic molecules consisting of mostly $^{12}C$ isotopes and which contain C—H and C—F bonds.

BACKGROUND OF THE INVENTION

The stable $^{13}C$ isotope has been widely used in many applications but until recently in relatively small volume. Recent medical development of the so-called carbon-13 Diagnostic Breath Test ($^{13}C$ DBT) (U.S. Pat. No. 4,830,010) has dramatically changed the situation. The DBTs are used to assess the condition of organs of the human digestive system. Because of its safety, relative simplicity and wide range of application, the DBT technology has rapidly increased the demand for $^{13}C$.

A limiting factor for the growth in the use of DBTs is the relatively high production cost of highly (>99%) isotopically pure $^{13}C$. The bulk of the $^{13}C$ at present is produced by multi-cycle low temperature distillation of CO. This technique is well developed and has nearly reached the maximum of its efficiency, limited by its high energy consumption.

The molecular laser isotope separation (MLIS) approach provides an alternative for production of high purity stable isotopes. The most developed method for MLIS of $^{13}C$ is based on infrared multiphoton dissociation (IRMPD) of $CF_2HCl$ by a pulsed $CO_2$ laser. This method relies on a 20 $cm^{-1}$ isotopic shift in the IR absorption spectrum of the $^{13}C$ containing molecules relative to $^{12}C$ containing molecules for selective absorption and dissociation of $^{13}CF_2HCl$. The $CF_2$ dissociation fragments recombine, resulting in stable $C_2F_4$ molecules that are separated from parent molecules by distillation.

An example of a recent implementation of this approach by Ivanenko et al. (Applied Physics B, 62, pp. 329–332, 1996) produce a macroscopic enrichment of $^{13}C$ using a high-power high repetition rate industrial $CO_2$ laser. A report by V. Y. Baranov et al., (Proceedings of 4th All-Russian International Scientific Conference on "Physical Chemical Processes at Selection of Atoms and Molecules", 1999, pp. 12–16) describes a near completed pilot plant in Kaliningrad, Russia, which is designed to produce several tens of kilograms of isotopically pure $^{13}C$ a year using the same approach. In both cases, $CF_2HCl$ is enriched to 30–50% in $^{13}C$ by selective IRMPD. In both cases, it is suggested that further enrichment of the products up to 99% $^{13}C$ could be accomplished by non-laser techniques such as centrifugation. In another approach, a second stage of laser separation is employed to bring partially enriched product to higher levels of enrichment (Ph. Ma et al., Appl. Phys. B 49 503 (1989)). In the case of $^{13}C$ isotope separation using $CF_2HCl$ as a starting material, the partially enriched product ($C_2F_4$) is chemically converted to a molecule suitable for the next laser isotope separation cycle (A. P. Dyad'kin, et al.; Proceedings of 4th All-Russian International Scientific Conference on "Physical Chemical Processes at Selection of Atoms and Molecules", 1999, pp. 17–20). This extra stage complicates the overall process and significantly increases cost of the product.

Under certain conditions, single-laser IRMPD of $CF_2HCl$ has demonstrated the capability of producing products highly enriched in $^{13}C$ in a single stage, but this high degree of enrichment comes at the cost of productivity. The work of Gauthier et al. (Appl. Phys. B. 28, 2, 1982) achieves enrichment to 96%, but this requires operating at low laser fluence and low pressure, both of which decrease he productivity. Reasonable productivity is achieved at only 50% $^{13}C$ enrichment, which falls short of the high purity (>99%) required for medical applications.

One approach to increase the selectivity in laser isotope separation is to use a single-stage two-laser process. U.S. Pat. No. 4,461,686 relates to two-color IR—IR MLIS wherein a first laser excites a non-specified vibrational state and a second laser excites molecules up to a level of a chemical conversion, including dissociation. A similar method has been successfully realized on a laboratory scale by Evseev et al. (Appl. Phys. B36, 93, 1985; Sov. J. Quantum Electron. 18, 385, 1988). While this approach overcomes some of the drawbacks of a single-laser process and achieves relatively high selectivity (S=6000 which corresponds to $^{13}C$ enriched to 98.5%), low pressure is still required, limiting the productivity.

One widely known problem of two-laser isotope separation schemes is the possibility of vibrational relaxation of the molecules in the time between the two laser pulses, leading to loss of isotopic selectivity, U.S. Pat. No. 4,461, 686 clearly states this problem by specifying a time delay between laser pulses that is shorter than the vibrational relaxation time but longer than the rotational relaxation time of the polyatomic molecules, allowing time for rotational but not for vibrational relaxation.

A number of other two-laser schemes have been employed for separation of various isotopic species, but in most cases, conditions are adjusted to minimize collisions in the time between the two laser pulses and/or the deleterious effects of collisions on the selectivity is explicitly mentioned. In their two-color infrared isotopically selective decomposition of $UF_6$, Rabinowitz et al. (Optics Letters 7, 212 (1982)) indicate that they use pressures of less than $10^{-7}$ Torr during runs, ensuring collision free reactions. They clearly state that energy-exchange collisions between the two isotopic species may scramble the selectivity. Using a similar two-color laser isotope separation scheme for $SeF_6$, Tiee and Wittig (J. Chem. Phys. 69, 4756 (1978)), state that they use a delay between the two lasers that is short enough so that deleterious energy transfer processes do not have a chance to interfere. In their two-color multiple photon dissociation of $CF_3T$, Pateopol and O-Neil (Laser Isotope Separation, SPIE, Vol. 1859, p. 210–218 (1993)) show in FIG. 4 that an increase in pressure, which increases the frequency of collisions, decreases the isotopic selectivity. In a two laser scheme for separation of sulfur isotopes, French patent FR2530966A does not explicitly mention collisions but uses sufficiently low pressure and short time delay such that vibrational relaxation from collisions between the two laser pulses is minimized. In their two laser dissociation scheme for $OsO_4$, Ambartzumian et al. (Optics Letters 1, 22 (1977)) do not mention collisions, however the information they provide on the experimental conditions, particularly the low pressure (~0.3 Torr) suggests that no collisional vibrational relaxation occurs during the process.

A few studies have observed that under certain conditions, collisions seem to enhance the isotopic selectivity. In their single-laser IRMPD of $CF_2HCl$ for $^{13}C$ enrichment, Gauthier et al. (Appl. Phys. B. 28, 2, 1982, FIG. 3) demonstrate increasing selectivity with increasing pressure. This increase in selectivity is accompanied with a corresponding decrease in dissociation efficiency (also FIG. 3), leading to low values of productivity. In their two-laser IRMPD studies of $CF_2HCl$ for $^{13}C$ enrichment, Evseev et al. (Appl. Phys. B36, 93, 1985; Sov. J. Quantum Electron. 18, 385, 1988) observe modest increase in selectivity both upon increase in the pressure of the working gas as well as upon increasing the delay between the two lasers. They attribute the increased selectivity to different rates of vibrational— vibrational exchange of "hot" ensembles of $^{12}C$ and $^{13}C$ containing molecules with the ensemble of "cold" unexcited molecules of the main isotope, although they propose no explanation for the rate difference.

We believe that the attribution by Evseev et al. of the pressure and time-delay dependence of the isotopic selectivity to a difference in collisional deactivation rates is essentially correct, although the particular pre-excitation technique that they use, namely $CO_2$ laser infrared multiphoton excitation (IRMPE), prohibits them from exploiting this effect for simultaneously achieving both high selectivity and high productivity in $^{13}C$ isotope separation. IRMPE can either pre-excite molecules to a few low energy vibrational levels when the laser fluence is low, or to a wider distribution of higher energy levels if the laser fluence is high. In both cases, the collisional effect can provide only a limited improvement of selectivity. Indeed, the 6000 maximum isotopic selectivity in their work has been achieved only for relatively low pressure (2.5 Torr) and only for cold molecules (−65° C.). Cooling molecule to temperatures in the range of −60 to −70° C. itself typically increases selectivity of this process by a few times.

The process that is the subject of this present invention makes use of our fundamental understanding of the mechanism of isotopically selective collisional vibrational relaxation to devise a two-laser isotope separation scheme that can make optimal use of this collisional phenomenon. Our experiments show that a selectivity of greater than 9000 can be achieved at room temperature and at pressures greater than 50 Torr.

SUMMARY OF THE INVENTION

An object of the invention is to provide a two-laser infrared multiphoton dissociation process for isotope separation that can produce highly isotopically enriched species in a single stage.

According to the invention, this object is achieved by the method as set out below.

In this method, the radiation of the first laser has a predetermined frequency to excite by a single-photon a low overtone vibrational transition of the polyatomic parent molecules, in particular a hydrogen stretch vibration, to produce vibrational pre-excited molecules at a well defined energy enriched in the desired isotope, for instance $^{13}C$.

The radiation of the second laser has a predetermined frequency and predetermined energy fluence to induce selective dissociation of the vibrationally pre-excited excited molecules by infrared multiphoton excitation, in particular of a C-F stretch vibration.

The product of the pressure of the molecules and the time-lag $\Delta t$ between the pre-excitation by the first laser pulse and the dissociation during the second laser pulse (which results from the effective length of the second laser pulse plus any time delay of the second laser pulse relative to the first laser pulse), is sufficiently high to allow collisional vibrational deactivation of a substantial amount of the vibrationally pre-excited molecules containing non-desired isotope(s), like $^{12}C$, before dissociation of the vibrationally excited molecules occurs while having no significant collisional vibrational deactivation of the pre-excited molecules containing the desired isotope, like $^{13}C$. The dissociation products are hence more highly enriched in the desired isotope as a result of collisions.

Collisions that occur between the two laser pulses and/or during the second pulse are hence used to increase significantly the isotopic selectivity.

As is described more fully below, the use of collisions to significantly increase the isotopic selectivity requires excitation by the first laser to a well defined energy of at least several thousand $cm^{-1}$. This is accomplished by direct, single photon excitation of a low overtone ($\Delta v=2$ or 3) of a hydrogen atom stretch vibration. The combination of low-overtone excitation by the first laser with isotopically selective collisional deactivation in the time between two laser pulses, followed by selective IRMPD of the pre-excited molecules induced by the second laser represents a unique feature of this invention.

This approach has several important advantages over other implementations of other IRMPD isotope separation schemes. First, vibrational overtone excitation with a continuously tunable laser can reach the maximum selectivity determined by the overlap in the spectra of two isotopic species, while conventional line-tunable $CO_2$ lasers cannot be sure to hit the point of minimum spectral overlap. Moreover, isotope shifts are in general greater for overtone transitions than for vibrational fundamentals. Secondly, overtone pre-excitation of a light atom stretch vibration can promote molecules directly to the vibrational quasicontinuum with a well defined energy, allowing the parameters of the dissociating laser to be optimized for this energy, preserving the isotopic selectivity gained in the first step. Because the IRMPD processes is applied to molecules already in the vibrational quasicontinuum, efficient dissociation occurs at relatively low (0.5–3 $J/cm^2$) $CO_2$ laser fluence, avoiding the need to focus the $CO_2$ laser beam. This permits a great increase of the irradiated volume, since collimated beams can be propagated together for meters, limited only by the beam divergence. While this is an important feature, it is not unique to our process. Most importantly, using vibrational overtone excitation for the first step, followed by collisions of the pre-excited molecules, enhances the isotopic selectivity of the process and at the same time allows higher working pressures where the density of molecules is higher, leading simultaneously to high selectivity (>99% isotopic purity) and reasonable productivity in a single stage process. This can make the process economically feasible and competitive with the current technologies.

Taken together, these factors indicate that the overtone excitation-IRMPD scheme according to the invention should provide a more efficient and selective means of laser isotope separation than previously developed MLIS schemes. The results described below demonstrate that this is indeed the case.

As mentioned above, isotope separation can operate with low fluence laser beams enabling interaction by multiphoton dissociation over a large volume. Consequently, the first and second laser beams can be collimated or slightly diverging or slightly converging beams of low fluence ($\leq 5$ J/cm$^2$) overlapping with one another over a substantial portion or all of their respective volumes containing the said polyatomic molecules. The first and second beams can have an angle of divergence/convergence less than $2.0 \times 10^{-3}$ rad.

The method according to the invention is particularly advantageous for separating $^{13}$C isotopes from polyatomic molecules consisting of mostly $^{12}$C isotopes and which contain C—H and C—F bonds, for example molecules of the formula HCF$_2$X, wherein X is F, Cl, B or I. There have been a number of other papers and patents that share these working molecules but use a completely different process which does not use collisions to enhance selectivity. We do not claim this class of compounds for laser isotope separation in general, but only as suitable candidates under the specific conditions of our process.

In one example, the molecules are trifluoromethane HCF$_3$, the frequency of the first laser is $8753 \pm 1$ cm$^{-1}$ or $8549 \pm 1$ cm$^{-1}$, the frequency of the second laser is in the range 1020–1070 cm$^{-1}$, and the predetermined energy fluence of the second laser has a value in the range 0.5–5 J/cm$^2$ depending on the pulse shape of the second laser. Alternatively, for trifluoromethane HCF$_3$, the frequency of the first laser is $5936.5 \pm 1$ cm$^{-1}$ or $5681 \pm 1$ cm$^{-1}$.

Alternatively, the molecules are CF$_2$HCl and the predetermined frequency of the first laser is $5911 \pm 5$ cm$^{-1}$ or $8693 \pm 2$ cm$^{-1}$, or the molecules are monofluoromethane CH$_3$F.

The first predetermined frequency can be produced by stimulated Raman scattering of narrowband tunable radiation of a solid state pulsed laser and the second predetermined frequency is produced by a pulsed CO$_2$ laser.

The method of the invention can also be applied to the separation of isotopes from other molecules including SiH$_4$, SiF$_3$H, SiCl$_3$H, GeH$_4$, and alcohols of the formula R—OH, where R=CH$_3$, C$_2$H$_5$, C$_3$H$_7$ or C$_4$H$_9$.

The overlapping first and second laser beams can be substantially parallel or can multiple intersect.

DETAILED DESCRIPTION

Figure 1:
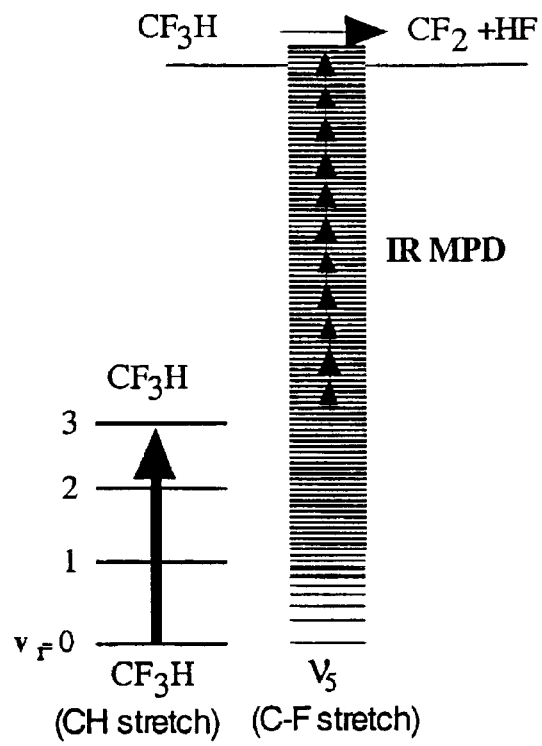
FIG. 1 is an energy level schematic for the isotope separation method according to the invention.

This description uses the example of CF$_3$H as a working molecule for $^{13}$C isotope separation, although the applicability of the invention is broader in terms of both potential working molecules as well as isotopes that can be separated. The method according to the invention comprises two steps, as shown schematically in FIG. 1. In the first step, a near-infrared laser pulse pre-excites molecules containing primarily the desired isotope via a low ($\Delta v=2$ or 3) overtone transition of the CH stretch vibration. Following this, a CO$_2$ laser pulse excites a C-F stretch of only the pre-excited molecules, selectively dissociating them by IRMPD, producing CF$_2$+HF. The isotopically selected CF$_2$ radicals are collected after combining to form C$_2$F$_4$.

Using a narrow bandwidth, continuously tunable laser for pre-excitation, we can choose the excitation frequency to be in exact resonance with an overtone transition of the desired isotopic species, provided the rotational structure of the overtone band is at least partially resolved. Even if the isotopic spectral shift is relatively small, given sufficient resolution it is possible to find parts of the spectrum where there is a minimum of overlap between the different isotopic species. In the case of $^{13}$C isotope separation using CF$_3$H as a parent molecule, this pre-excitation usually produces at least 80% $^{13}$C isotopes and at most 20% $^{12}$C isotopes, possibly about 90% $^{13}$C isotopes and about 10% $^{12}$C isotopes.

The second laser beam, the role of which is to dissociate pre-excited molecule via IRMPD, is arranged with a pulse length and/or delay relative to the first laser beam sufficient to allow a substantial amount of vibrationally excited molecules containing $^{12}$C to relax by vibrational state changing collisions to an energy from which they will not be efficiently dissociated. During this time, a substantial amount of the molecules containing $^{13}$C remain excited and available to be dissociated by the second laser pulse. Achieving enrichment to >99% in $^{13}$C isotopes in a single pass requires a substantial difference in the collisional vibrational relaxation rates of pre-excited molecules of different isotopic composition. It is not evident from the published literature that the vibrational relaxation rates of highly vibrationally excited molecules should show a strong isotope dependence. Previous studies of diatomic and triatomic molecules have shown that the detuning of energy levels upon isotopic substitution is sufficient to change the energy gap and hence the energy transfer rate in molecules excited with one quantum of vibrational excitation. For example, Stephenson et al. (J. Chem. Phys. 48, 4790 (1968)) have shown that for the following mixed isotope collisions in CO$_2$,

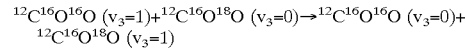

$\Delta E = 18$ cm$^{-1}$

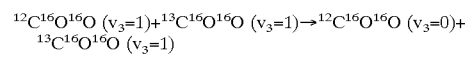

$\Delta E = 66$ cm$^{-1}$ the more than three-fold difference in the energy gap results in a difference in vibrational deactivation rate of a factor of 3.

One cannot expect a similar fractional difference in the energy gap to occur in a polyatomic molecule excited to a vibrational overtone level, however. For example, consider the specific case of a CF$_3$H molecule prepared in the $v_{CH}=3$ level prior to collision with other CF$_3$H molecules that are vibrationally unexcited. For the $^{13}$C species colliding with unexcited $^{12}$C molecules, the energetics of this process would be given by $$^{13}CF_3H(v_{CH}=3)+{}^{12}CF_3H(v_{CH}=0) \rightarrow {}^{13}CF_3H(v_{CH}=2)+{}^{12}CF_3H(v_{CH}=1)$$

$$\Delta E = -254 \text{ cm}^{-1}$$

while for vibrationally excited $^{12}$C molecules colliding with unexcited $^{12}$C molecules one would have $$^{12}CF_3H(v_{CH}=3)+{}^{12}CF_3H(v_{CH}=0) \rightarrow {}^{12}CF_3H(v_{CH}=2)+{}^{12}CF_3H(v_{CH}=1)$$

$$\Delta E = -240 \text{ cm}^{-1}$$

The difference in the energy gap of these two processes comes from the isotope effect on the difference in the v=3 to v=2 energy spacing. For both isotopic species, the 3→2 de-excitation process will be a few hundred cm$^{-1}$ out of resonance with the 0→1 excitation process because of the large anharmonicity of the C-H stretch. The small fractional difference in the energy deficit of the process between the $^{13}$C and $^{12}$C species is significantly less than the simple case of $CO_2$ shown above. It is difficult to imagine that such a small fractional difference in energy gap could lead to a substantial difference in vibrational energy transfer rates in $CF_3H$.

The key to understanding the phenomenon of collisional enhanced isotope selectivity exploited in this invention is to realize that the initially prepared state of $CF_3H$ is not a pure $v_{CH}=3$ stretch state. Vibrational state-mixing in these molecules has been extensively studied and is well understood (J. Segall et al., J. Chem. Phys. 86, 634 (1987)). Each overtone level with N CH stretch quanta is characterized by a polyad of N+1 strongly coupled states consisting of combinations of stretch and bend excitations. Thus for N=3, one has the group of coupled states (designated $|v_s, v_b>$ for the number of stretch and bend quanta respectively) $|3,0>$, $|2,2>$, $|1,4>$, and $|0,6>$. The eigenstates in this energy region can be expressed as linear combinations of these zeroth-order states:

$$|j> = c_1|3,0> + c_2|2,2> + c_3|1,4> + c_4|0,6>$$

Higher resolution spectroscopy of the CH stretch overtone levels in this molecule reveals that these "first-order" states are weakly coupled to other nearby states (O. V. Boyarkin and T. R. Rizzo, J. Chem. Phys. 105, 6285 (1996)). In the limit that all the available states within a small energy region about the $v_{CH}=3$ level are coupled in some measure, a state in this energy region can be represented as the following mixture $$|j\rangle = c_3|3\rangle|0\rangle|0\rangle \ldots |0\rangle + |2\rangle \sum_i c_{2i} \prod_{k=2}^{9} |v_{ki}\rangle + |1\rangle \sum_i c_{1i} \prod_{k=2}^{9} |v_{ki}\rangle + |0\rangle \sum_i c_{0i} \prod_{k=2}^{9} |v_{ki}\rangle$$

where the zeroth-order states are grouped by their number of CH stretch quanta. A simple state count would reveal that the most numerous zeroth-order states in this mixture are those with 0 quanta of CH stretch mode. In fact, the average occupation number of all the different vibrational modes of such a mixed state with ~9000 cm$^{-1}$ of energy is between 0 and 1.

Let us now consider the effect of state-mixing on the collisional energy transfer process. In a sense, one can expect this mixed state to behave more like a molecule with one quantum of vibration. In this case, the relevant processes for us to consider are now $$^{13}CF_3H\ (v=1) + {}^{12}CF_3H\ (v=0) \rightarrow {}^{13}CF_3H\ (v=0) + {}^{12}CF_3H\ (v=1)$$

and $$^{12}CF_3H\ (v=1) + {}^{12}CF_3H\ (v=0) \rightarrow {}^{12}CF_3H\ (v=0) + {}^{12}CF_3H\ (v=1)$$

where the vibrational quantum number v could refer to any vibrational mode. This process will be more nearly resonant as in the case of $CO_2$ presented above. For collisions between $^{12}$C containing molecules, the only energy deficit will be due to the cumulative effect of the off-diagonal anharmonicities between the C-H stretch mode and the other modes of the molecule. For collisions between $^{13}$C and $^{12}$C containing molecules, the energy deficit will be the sum of the these off-diagonal anharmonicities together with the isotope shifts. For every mode, the isotope shift will make the collisions of $^{13}$C containing molecules be further off-resonant than the $^{12}$C containing molecules. Since most off-diagonal anharmonicities tend to be small, the isotope shift should represent a substantial fraction of the energy gap for the energy transfer process. In view of the steep dependence of the v—v transfer rate on the energy gap, this would lead to a substantial difference in relaxation rates for vibrationally excited $^{13}CF_3H$ and $^{12}CF_3H$.

This model for the detailed mechanism of the difference in collisional relaxation rates between two isotopomers allow us to chose conditions in which we can fully exploit this phenomenon for isotope separation. In order to use collisional enhancement of the isotopic selectivity effectively, the first laser excitation step needs to fulfil several requirements:

(1) It must pre-excite molecules to a sufficiently high energy such that the vibrational states are substantially mixed in the sense described above. All molecules exhibit such state-mixing, but the energy at which it occurs is molecule specific.

(2) It must pre-excite molecules to a sufficiently high energy such that the second laser can selectively dissociate pre-excited molecules and not unexcited molecules.

(3) It must pre-excite molecules to a well defined energy, such that the parameters of the second laser can be optimized to dissociate selectively those molecules that have not undergone substantial vibration energy relaxation by collisions. This requires single-photon and not multiple-photon excitation.

If condition (1) is not fulfilled, the collisional vibrational relaxation rates of the two isotopes of a highly excited molecule would not be sufficiently different to enhance the selectivity of the isotope separation process. If either condition (2) or condition (3) is not fulfilled, the second laser will not be able to selectively dissociate the desired isotope, even if the vibrational relaxation rates are different. Previous two-laser isotope separation techniques do not fulfill these requirements and hence are not able to achieve both high selectivity and reasonable productivity simultaneously.

The following Example illustrates experiments underlying the invention and its implementation on laboratory scale.

EXAMPLE

Exemplary of this new approach for isotope separation, trifluoromethane, $CF_3H$, is used as the parent molecule for $^{13}C$ isotope separation. Trifluoromethane was chosen for the following reasons:

(1) It has an IR active light atom vibration associated with the carbon atom ($^{13}C$-H stretch, $\upsilon_1$=3025.3 cm$^{-1}$), through which a substantial amount of vibrational energy can be deposited into a molecule via a low overtone transition. The isotopic shift in the $3\upsilon_1$ band of 39.7 cm$^{-1}$ is appreciable.

(2) The vibrational states accessed by a CH stretch overtone excitation are substantially mixed.

(3) It has another IR active vibration with a fundamental frequency shifted to the high frequency side of a conventional $CO_2$ laser ($^{13}C$-F stretch, $\upsilon_5$=1132.4 cm$^{-1}$). One can expect that the optimum frequency for IRMPD of vibrationally excited molecules lies within tuning range of $CO_2$ laser.

(4) The IRLAPS detection technique has been successfully implemented for studying the overtone spectroscopy of this molecule, and we know that IRMPD of vibrationally excited $CF_3H$ can be fulfilled with high selectivity. See for example papers by Boyarkin/Settle/Rizzo in Ber. Bunseges. Phys. Chem. 99, 504 (1995) and by Boyarkin/Rizzo in J. Chem. Phys. 105, 6285 (1996).

(5) The lowest dissociation channel for $CF_3H$ produces $CF_2$ and HF. Because the $CF_2$ fragment is the same as that from the IRMPD of $CF_2HCl$, we can take advantage of the large body of work on $CF_2$ collection in this highly studied system.

Figure 2:
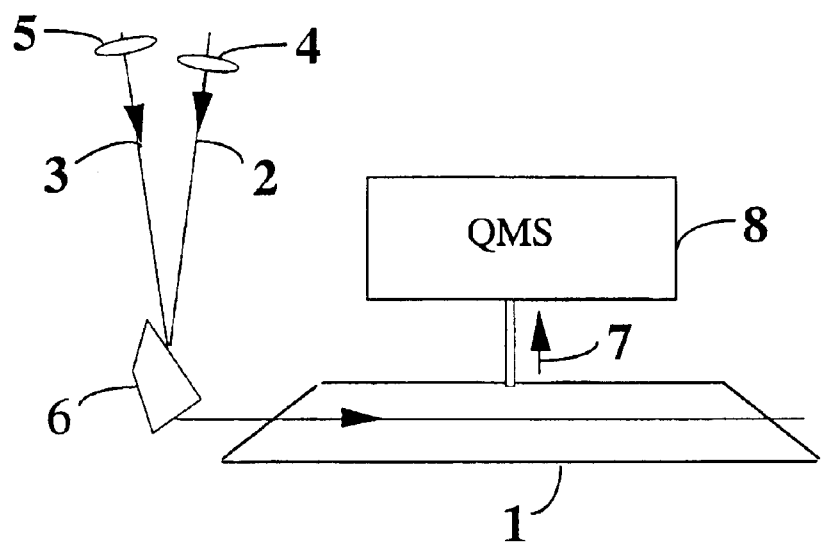
FIG. 2 is a diagram of an apparatus used to carry out the isotope separation method according to the invention.

FIG. 2 schematically illustrates an experimental apparatus, comprising a cylindrical glass cell 1 (which is shown in two-dimensional projection, 2 cm in diameter, 50 cm long) with $BaF_2$ windows filled with $CF_3H$ to a specific pressure as measured by a capacitance manometer.

A 20–25 mJ pre-excitation laser pulse 2, generated by Raman shifting a 90 mJ pulse from a Nd:YAG pumped dye laser (Spectra Physics GCR-270, Lumonics HP 500) in high pressure $H_2$, promotes $CF_3H$ molecules in cell 1 at 7.5 mbar pressure to the $3\upsilon_1$ (CH stretch) level via the Q-branch at 8753 cm$^{-1}$. This laser pulse 2, which has a duration of 5–6 nanoseconds, is focused into the center of cell 1 by an F=+120 cm lens 4, giving an estimated maximum fluence of 1–2 J/cm$^2$ at the beam waist.

After a fixed delay, a pulse 3 from the $CO_2$ laser (Lumonics, TEA-850) arrives and selectively dissociates the vibrationally pre-excited molecules via IRMPD to produce $CF_2$ and HF. This beam 3 is first truncated to a size of 5–10 mm diameter by passing it through an adjustable iris and then focused by an F=+75 cm lens 5 to a 2×2 mm$^2$ beam waist. Its fluence can be varied over a wide range. This pulse consists of a peak of 150 ns FWHM followed by a 2–3 μsec tail carrying more than 60% of the total pulse energy. The two laser beams 2,3 (i.e. the pre-excitation laser and $CO_2$ laser) are combined on a 10 mm thick $BaF_2$ Pellin-Broca prism 6 and enter the cell 1 from the same side.

The $CF_2$ dissociation products eventually recombine to form $C_2F_4$, which is sampled from cell 1 at 7. The relative concentrations of the $C_2F_4$ with different carbon isotopes are measured in quadrupole mass-spectrometer 8 at atomic masses 100 ($^{12}C_2F_4$), 101 ($^{12}CF_2{}^{13}CF_2$) and 102 ($^{13}C_2F_4$). The productivity of the process for $^{13}C$ is determined as twice the integral of the signal at mass 102 plus the integral of signal at mass 101. Correspondingly, the productivity of $^{12}C$ is twice the integral of the signal at mass 100 plus the integral of signal at mass 101. The percentage of $^{13}C$ is determined as a ratio of the $^{13}C$ productivity to the total productivity of the process.

Figure 3:
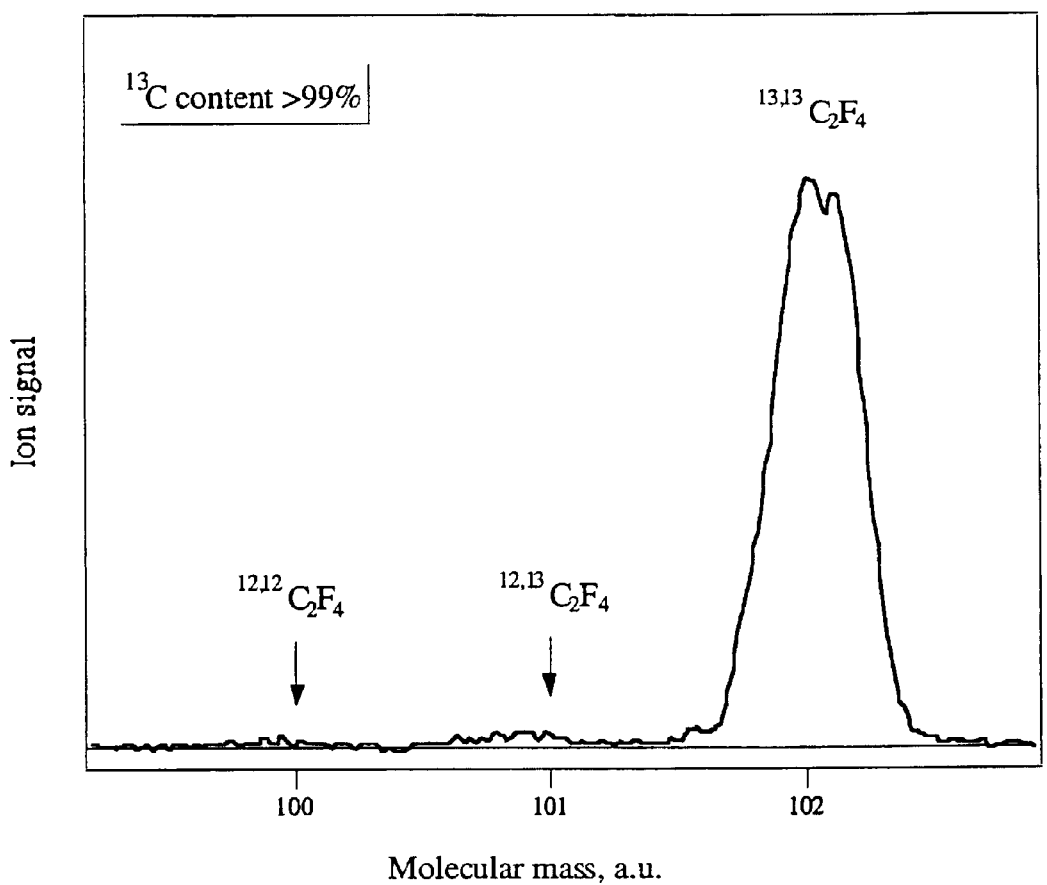
FIG. 3 shows a typical mass-spectrum of C$_2$F$_4$ products enriched with $^{13}$C isotopes by the method according to the invention.

FIG. 3 represents a typical mass-spectrum of $C_2F_4$ products generated by the procedure described above using the apparatus of FIG. 2. The pressure of the $CF_3H$ sample in cell 1 is 7.5 mbar, the time-delay between the end of the pre-excitation pulse 2 and the beginning of the dissociating $CO_2$ laser pulse 3 is 75 ns, and the $CO_2$ laser fluence is adjusted to 2.5 J/cm$^2$. The spectrum has been obtained after 10 min irradiation of the sample with the lasers operating at 10 Hz laser repetition rate. The observed ratio of signals at masses 100–102 corresponds to >99% $^{13}C$ concentration in the $C_2F_4$ product. The estimated dissociation yield for each pair of laser pulses is 1.5–3% of all $^{13}CF_3H$ molecules within the irradiated volume. These results represent a record in $^{13}C$ performance by MLIS.

Figure 4:
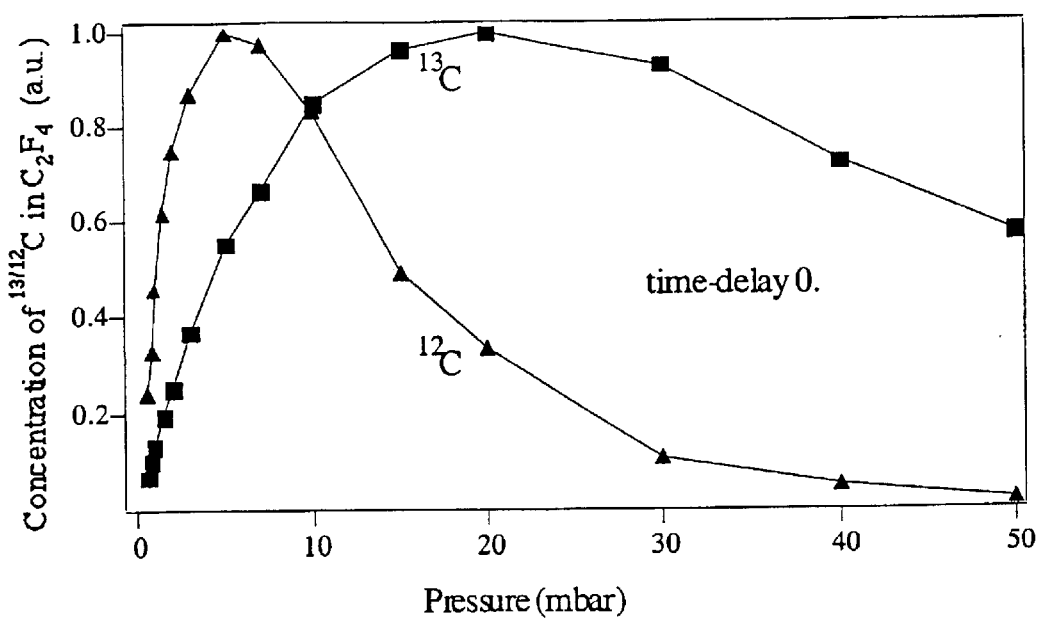
FIG. 4 shows the concentration of $^{12}$C and $^{13}$C in the C$_2$F$_4$ dissociation product obtained in an experimental set-up, as a function of the pressure at zero time-delay between the two pulses (time-lag $\Delta t \approx 35$ ns)
Figure 5:
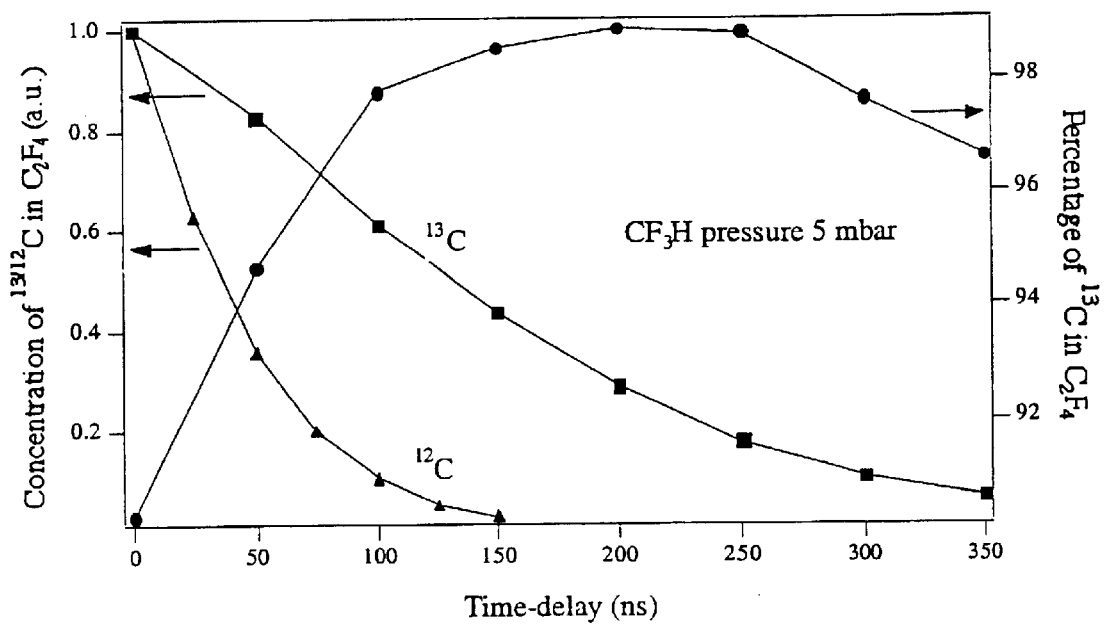
FIG. 5 shows the concentration of $^{12}$C and $^{13}$C in the C$_2$F$_4$ dissociation product and the percentage of $^{13}$C in the C$_2$F$_4$ dissociation product as a function of time-delay between the overtone excitation laser pulse and the CO$_2$ laser pulse.

The importance of collisional vibrational deactivation of $CF_3H$ molecules pre-excited to the $3\upsilon_1$ level is illustrated by FIGS. 4 and 5.

FIG. 4 represents the pressure dependence of the concentration of $^{12}C$ (triangles, left hand scale; experiment (a)) and $^{13}C$ (squares, left hand scale; experiment (b)) in the $C_2F_4$ dissociation product. In experiment (a), the wavelength of the first laser was tuned such that the amount of pre-excited $^{12}CF_3H$ at 10 mbar is about the same as the amount of pre-excited $^{13}CF_3H$ in experiment (b) at 10 mbar.

The experiments of FIG. 4 have been performed at zero time-delay between the two laser pulses and with at $CO_2$ laser fluence of 7 J/cm$^2$. In this case, the time-lag Δt=about 35 ns, as explained below for FIG. 5. All other parameters are as indicated above. One can see that the peak concentration of $^{12}C$ and $^{13}C$ in the $C_2F_4$ occurs at different pressure, and this is a result of more rapid collisional vibrational deactivation of the pre-excited $^{12}CF_3H$ as compared to $^{13}CF_3H$ during the $CO_2$ laser pulse. The total number of the pre-excited molecules grows linearly with pressure, but competition with collisional deactivation reduces the number of pre-excited $CF_3H$ that can be dissociated at a given fluence of the $CO_2$ laser. Consequently, the amount of $C_2F_4$ produced initially increases with increasing pressure but then drops. The rate of this drop is different for different carbon isotopes.

FIG. 5 shows the concentration of $^{12}C$ (triangles, left hand scale; experiment (a)) and $^{13}C$ (squares, left hand scale; experiment (b)) in the $C_2F_4$ dissociation product and the percentage of $^{13}C$ in the $C_2F_4$ dissociation product (circles, right-hand scale; experiment (b)) as a function of time-delay between the overtone excitation laser pulse and the $CO_2$ laser pulse. In experiment (a), the wavelength of the first laser was tuned such that about the same amount of $^{12}CF_3H$ was pre-excited as the amount of $^{13}CF_3H$ in experiment (b). Because these measurements are made in two different experiments, the percentage of $^{13}C$ cannot simply be calculated from the concentrations of both isotopes shown in the Figure.

FIG. 5 illustrates the productivity for the two isotopes and the percentage of $^{13}C$ in the $C_2F_4$ product as a function of the time-delay between the two laser pulses at 5 mBar $CF_3H$ pressure and $CO_2$ laser fluence of 3.5 J/cm$^{-2}$. It is clear that the percentage of $^{13}C$ in $C_2F_4$ grows with increasing delay up to about 200 ns—that is with increasing number of vibrationally deactivating collisions. One can see that because of this deactivation, the total amount of produced $C_2F_4$ drops as a function of time delay, but it does so at different rates for the two different isotopes of carbon.

Thus, both the final percentage of $^{13}C$ in the $C_2F_4$ product and the productivity of the $^{13}C$ separation process can be controlled by the parameter P·Δt, where P is $CF_3H$ pressure and Δt is a time between the pre-excitation by the first laser pulse and the dissociation during the second laser pulse. This implies a time-delay between the two laser pulses and an effective duration of the dissociating pulse (i.e., the time the pulse is on before dissociation, which we have determined to be about 35 ns for the $CO_2$ laser pulse shape used here). Production of $C_2F_4$ highly enriched in $^{13}C$ therefore requires this parameter, $P \cdot \Delta t$, to be large enough for near all vibrationally pre-excited $^{12}CF_3H$ to be collisionally deactivated. For a quantitative estimate of the optimal parameter $P \cdot \Delta t$, values for the vibrational deactivation constants from the $3\upsilon_1$ level have been determined experimentally to be about $^{13}K_3 = 1.5$ $\mu$s mbar and $^{12}K_3 = 4.5$ $\mu$s mbar for $^{13}CF_3H$ and $^{12}CF_3H$ respectively.

Another aspect illustrated by this example is the relatively low fluences of the pump and the dissociating radiation required for the process to be highly selective while retaining a reasonably high level of productivity. This permits the use of collimated rather than focused laser beams, provided the pulse energies of two lasers are high enough. This allows the volume in which both laser energy fluences are in the optimal range to be much larger than what can be achieved with focused beams.

The difference between collimated and focused beams is illustrated as follows. Suppose the pre-excitation laser delivers 0.5 J pulse energy in an about 8 mm beam with divergence $2 \cdot 10^{-3}$. This gives an energy fluence of about 1 $J/cm^2$. This can be achieved, for example, by stimulated Raman scattering of output of an alexandrite solid state laser in high pressure $H_2$. A dissociating beam of the same diameter and divergence and with 2–3 $J/cm^2$ energy fluence can be produced by a TEA $CO_2$ laser. These two beams can be overlapped for a length of up to 3.3 meters before the fluences will drop to a half of their initial values because of divergence. This gives about a 0.25 liter irradiated volume where the process occurs. After each pass, the beams can be slightly recollimated and sent again to the reactor to increase the active volume by several times. This can be compared with a typical active volume of a few $mm^3$ achieved in experiments with focused laser beams. Thus, the low laser fluences required for the described process allows irradiation of large volumes by collimated beams.

What is claimed is:

1. A method of separating a desired isotope from a starting material comprising polyatomic molecules containing different isotopes, by applying to said molecules in the gas phase, at a predetermined pressure P, infrared radiation of a first pulsed laser to excite by a single photon an overtone transition of a light-atom stretch vibration of said molecules to produce vibrationally pre-excited molecules enriched in the desired isotope, and, infrared radiation of a second pulsed laser of different frequency to induce a chemical reaction resulting in a molecule constituting a dissociation product, enriched in the desired isotope, which can be separated from the starting material, wherein:

the radiation of the first laser has a predetermined frequency optimized to select the desired isotope via a single-photon transition;

the first laser pre-excites the polyatomic molecules to an excited vibrational level that is high enough in energy to allow an increase in isotopic selectivity by collisions;

the radiation of the second laser selectively induces dissociation of the vibrationally pre-excited molecules by infrared multiphoton excitation, at a time $\Delta t$ after the pre-excitation by the first laser pulse;

the pressure, P, and the time, $\Delta t$, between the pre-excitation by the first laser pulse and the dissociation during the second laser pulse have a pressure-time product $P \cdot \Delta t$, the magnitude of this pressure-time product $P \cdot \Delta t$ being sufficiently high to allow collisional vibrational deactivation of a substantial amount of the vibrationally pre-excited molecules containing non-desired isotope(s) before dissociation of the vibrationally excited molecules occurs while achieving significantly less collisional vibrational deactivation of the pre-excited molecules containing the desired isotope;

whereby said collisions that occur in said time $\Delta t$ between pre-excitation by the first laser pulse and the dissociation during the second laser pulse enhance the isotopic selectivity of the isotopic separation method, such that said dissociation products is highly enriched in the desired isotope.

2. The method of claim 1 wherein the polyatomic molecules of the starting material consist mostly of $^{12}C$ isotopes and further contain $^{13}C$ isotopes, said polyatomic molecules containing C—H and C—F bonds, said method separating the $^{13}C$ isotopes from the polyatomic molecules.

3. The method of claim 2, wherein the polyatomic molecules of the starting material are of the formula $HCF_2X$, where X is F, Cl, B or I.

4. The method of claim 2, wherein the polyatomic molecules of the starting material are trifluoromethane $CHF_3$ and the predetermined frequency of the first laser is $8753 \pm 1$ $cm^{-1}$ or $8549 \pm 1$ $cm^{-1}$ and the predetermined frequency of the second laser is in the range 1020–1070 $cm^{-1}$.

5. The method of claim 4, wherein the first laser produces at least 80% of said pre-excited molecules containing $^{13}C$ and at most 20% of said pre-excited molecules containing $^{12}C$ and the magnitude of said pressure-time product $P \cdot \Delta t$ is sufficient to achieve said dissociation products enriched to >95% in $^{13}C$ isotopes for each pair of the laser pulses.

6. The method of claim 5, wherein the first laser produces about 90% of said pre-excited molecules containing $^{13}C$ and at most 10% of said pre-excited molecules containing $^{12}C$ and the magnitude of said pressure-time product $P \cdot \Delta t$ is sufficient to achieve said dissociation products enriched to >99% in $^{13}C$ isotopes for each pair of the laser pulses.

7. The method of claim 2, wherein the polyatomic molecules of the starting material are trifluoromethane $HCF_3$ and the predetermined frequency of the first laser is $5936.5 \pm 1$ $cm^{-1}$ or $5681 \pm 1$ $cm^{-1}$.

8. The method of claim 2, wherein the polyatomic molecules of the starting material are $CF_2HCl$ and the predetermined frequency of the first laser is $5911 \pm 5$ $cm^{-1}$ or $8693 \pm 2$ $cm^{-1}$.

9. The method of claim 2, wherein the polyatomic molecules of the starting materials are monofluoromethane $CH_3F$.

10. The method of claim 1, wherein the polyatomic molecules of the starting material are selected from $SiH_4$, $SiF_3H$, $SiCl_3H$, $GeH_4$ and alcohols of the formula R—OH where R=$CH_3$, $C_2H_5$, $C_3H_7$ or $C_4H_9$.

11. The method of claim 1 wherein the first and second lasers are collimated or slightly diverging or slightly converging beams of low fluence overlapping with one another over a substantial portion or all of their respective volumes containing the polyatomic molecules.

* * * * *